(12) United States Patent
Yasumura

(10) Patent No.: US 6,388,902 B1
(45) Date of Patent: May 14, 2002

(54) SWITCHING POWER SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/720,964

(22) PCT Filed: May 2, 2000

(86) PCT No.: PCT/JP00/02915

§ 371 Date: Mar. 29, 2001

§ 102(e) Date: Mar. 29, 2001

(87) PCT Pub. No.: WO00/69058

PCT Pub. Date: Nov. 16, 2000

(30) Foreign Application Priority Data

May 7, 1999 (JP) .......................................... 11-126980

(51) Int. Cl.[7] .............................................. H02M 3/335
(52) U.S. Cl. ..................................... 363/21.02; 363/49
(58) Field of Search ........................ 363/19, 20, 21.02, 363/21.08, 21.12, 21.16, 49, 97, 131; 323/901

(56) References Cited

U.S. PATENT DOCUMENTS 5,216,585 A    6/1993  Yasumura
5,777,864 A  * 7/1998  Seong et al. .................. 363/98
5,831,838 A   11/1998  Illingworth

FOREIGN PATENT DOCUMENTS

| EP | 0 883 231 | 12/1998 |
| JP | 10210745  | 8/1998  |
| JP | 10225121  | 8/1998  |

* cited by examiner

Primary Examiner—Gregory Toatley
Assistant Examiner—Gary L. Laxton
(74) Attorney, Agent, or Firm—Frommer Lawrence & Haug LLP; William S. Frommer

(57) ABSTRACT

A switching power supply circuit is disclosed which allows selective use of a switching element having a comparatively low voltage withstanding property and a low current capacity and can be produced in a low lost and with a small size. Upon starting of power supply, the switching frequency of the switching element is raised by a soft starting circuit to increase a period of time until a secondary side DC output voltage reaches a steady level thereof As a result, the levels of a resonance voltage and a collector current obtained when the switching element starts its switching operation are suppressed.

15 Claims, 10 Drawing Sheets

FIG.3A Vcp

FIG.3B Icp

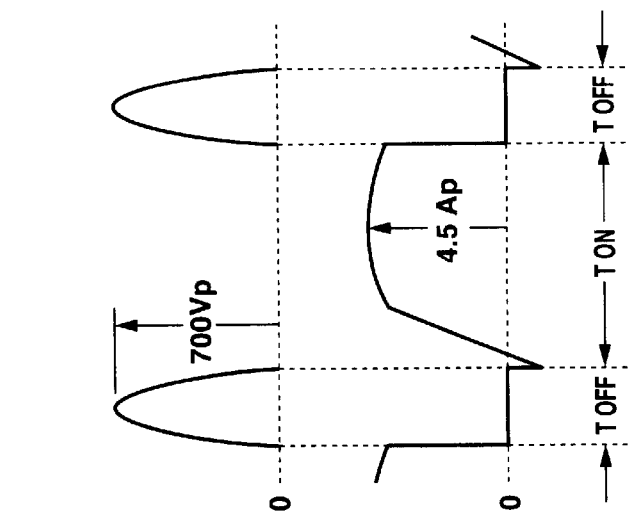
FIG.11A Vcp
FIG.11B Icp
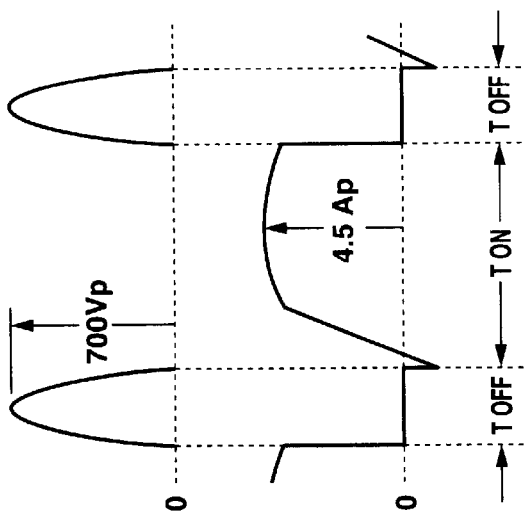
FIG.11C
FIG.11D

SWITCHING POWER SUPPLY CIRCUIT

TECHNICAL FIELD

This invention relates to a switching power supply circuit which can be incorporated as a power supply in various electronic apparatus.

BACKGROUND ART

A switching power supply circuit which adopts a switching converter in the form of, for example, a flyback converter or a forward converter is widely known. Because switching converters of these types employ a rectangular waveform signal to control a switching operation, these switching converters are limited in the amount of switching noise they can suppress. It is also known that these switching converters also are limited in power conversion efficiency because of their operation characteristics.

Thus, various switching power supply circuits that employ resonance type converters have been proposed by the assignee of the present application. A resonance type converter is advantageous in that a high power conversion efficiency can be readily obtained while maintaining low noise characteristics because the waveform controlling the switching operation is a sine waveform. This resonance type converter is also advantageous in that it can be simply formed from a comparatively small number of parts.

FIG. 7 shows an example of a switching power supply circuit which has been previously proposed by the assignee of the present application. Referring to FIG. 7, a power supply circuit 700 includes a voltage resonance type converter including a single switching element Q1 that performs a switching operation in a self-excited manner in accordance with a single end system.

Switching power supply circuit 700 includes a rectifier smoothing circuit for receiving a commercial ac power supply (ac input voltage VAC) and producing a DC input voltage. The rectifier smoothing circuit is formed as a full-wave rectifier circuit, comprising a bridge rectifier circuit Di and a smoothing capacitor Ci. The rectifier smoothing circuit produces a rectified smoothed voltage Ei of a level equal to the ac input voltage VAC. Further, an inrush current limitation resistor Ri is interposed in a rectifier current path of the rectifier smoothing circuit in order to suppress any initial inrush current spike from flowing into a smoothing capacitor Ci, for example, when an initial power supply is provided to the circuit. Further, in power supply circuit 700 an AC switch SW is interposed in the commercial ac power supply line. AC switch SW is switched on/off to start/stop flow of power to power supply circuit 700.

A voltage resonance type switching converter is provided in power supply circuit 700. This switching converter, as described above, has a self-exciting construction including switching element Q1. In this instance, switching element Q1 may be formed of a bipolar transistor (BJT: junction transistor) having a high voltage withstanding property. As is shown in FIG. 7, the base of switching element Q1 is connected to the positive electrode side of smoothing capacitor Ci (rectified smoothed voltage Ei) through a starting resistor RS so that the base current upon start-up of the circuit may be obtained from the rectifier smoothing circuit. Further, a resonance circuit adapted to be driven in a self-excited oscillation state is connected between the base of switching element Q1 and a primary side ground 710. The resonance circuit is formed from the series circuit connection of an induction characteristic LB of a detection driving winding NB, a resonance capacitor CB, and a base current limiting resistor RB.

A damper diode DD is interposed between the base of the switching element Q1 and the negative electrode (set at a primary side ground) of smoothing capacitor Ci and forms a path for damper current which flows when the switching element Q1 is switched off. The collector of switching element Q1 is connected to an end of a primary winding N1 of an insulating converter transformer PIT. The emitter of switching element Q1 is grounded.

A parallel resonance capacitor Cr is connected in parallel between the collector and the emitter of switching element Q1. Parallel resonance capacitor Cr forms, based on a capacitance thereof and a leakage inductance L1 of primary winding N1 of insulating converter transformer PIT, a primary side parallel resonance voltage resonance type converter circuit. Although detailed description is omitted here, when the switching element Q1 is off, a voltage resonance type operation is obtained by an action of the parallel resonance circuit which causes the voltage Vcp across resonance capacitor Cr to actually exhibit a pulse wave of a sine waveform.

An orthogonal control transformer PRT shown in FIG. 7 is a saturatable reactor on which a detection winding ND, a drive winding NB and a control winding NC are wound. Orthogonal control transformer PRT is provided for driving switching element Q1 and controlling an output voltage to be constant. Though not shown, orthogonal control transformer PRT is formed with a structure wherein a three dimensional core is formed such that two double channel-shaped cores each having four magnetic legs are joined to each other at the ends of the magnetic legs thereof. Detection winding ND and Drive winding NB are wound in the same winding direction around two predetermined ones of the magnetic legs of the three dimensional core, and the control winding NC is wound around two predetermined ones of the magnetic legs of the three dimensional core such that the winding direction thereof is orthogonal to detection winding ND and the drive winding NB.

Detection winding ND of orthogonal control transformer PRT (frequency variation means) is interposed in series between the positive electrode of smoothing capacitor Ci and primary winding N1 of insulating converter transformer PIT so that a switching output of the switching element Q1 is transmitted to detection winding ND through primary winding N1 . In orthogonal control transformer PRT, the switching output obtained in detection winding ND is excited in driving winding NB via transformer coupling, and consequently, an alternating drive voltage is generated in driving winding NB. The drive voltage is output as drive current from the series resonance circuit (NB and CB), which forms the self-excited oscillation drive circuit, to the base of switching element Q1 through base current limiting resistor RB. Consequently, switching element Q1 performs a switching operation at a switching frequency determined by the resonance frequency of the series resonance circuit (NB and CB). Insulating converter transformer PIT transmits a switching output of the switching element Q1 to the secondary side thereof, including secondary winding $N_2$.

Referring next to FIG. 8, the structure of insulating converter transformer PIT will be described. Insulating converter transformer PIT includes an EE-shaped core which includes a pair of E-shaped cores CR1 and CR2 made of, for example, a ferrite material and coupled with each other such that magnetic legs thereof are opposed to each other. A primary winding N1 and a secondary winding N2 are wound separately from each other on the central magnetic legs of the EE-shaped core using a split bobbin B. As seen from FIG. 8, a gap G is formed between the central magnetic legs of the EE-shaped core. Consequently, a loose coupling having a required coupling coefficient can be obtained. The gap G can be formed by providing the central magnetic legs of the E-shaped cores CR1 and CP2 shorter than the other two outer magnetic legs. The coupling coefficient k in this instance is, for example, k0 0.85 which is a coupling coefficient of a loose coupling. Consequently, a saturation condition is less likely to be obtained as much.

Referring back to FIG. 7, one end of primary winding N1 of insulating converter transformer PIT is connected to the collector of the switching element Q1. The other end of primary winding N1 is connected to the positive electrode of smoothing capacitor Ci (rectified smoothed voltage Ei) through a series connection of detection winding ND.

On the secondary side of insulating converter transformer PIT, an alternating voltage induced by primary winding Ni appears in secondary winding N2. A secondary side parallel resonance capacitor C2 is connected in parallel to secondary winding N2. A parallel resonance circuit is therefore formed from a leakage inductance L2 of secondary winding N2 and a capacitance of secondary side parallel resonance capacitor C2. The alternating voltage induced in secondary winding N2 is converted into a resonance voltage by the parallel resonance circuit. In short, a voltage resonance operation is obtained on the secondary side.

Thus, in the power supply circuit of FIG. 7, a parallel resonance circuit for generating a voltage resonance type switching operation is provided on the primary side of insulated converter transformer PIT, and a parallel resonance circuit for obtaining a full-wave rectification operation (voltage resonance operation) is provided on the secondary side of insulated converter transformer PIT. It is to be noted that, in the present specification, a switching converter of a construction which includes resonance circuits for both of the primary side and the secondary side in this manner is suitably referred to as "composite resonance type switching converter".

In the parallel resonance circuit on the secondary side of insulated converter transformer PIT formed as described above, center taps are provided for secondary winding N2, and rectifier diodes D01, D02, D03 and D04 and smoothing capacitors C01 and C02 are connected in such a manner as shown in FIG. 7 to provide two full-wave rectifier circuits; a first full-wave rectifier circuit including rectifier diodes D01 and D02 and smoothing capacitor C01, and a second full-wave rectifier circuit including rectifier diodes D03 and D04 and smoothing capacitor C02.

The first full-wave rectifier circuit composed of rectifier diodes D01 and D02 and smoothing capacitor C01 receives a resonance voltage supplied from the secondary side parallel resonance circuit and produces a DC output voltage E01. The second full-wave rectifier circuit composed of rectifier diodes D03 and D04 and smoothing capacitor C02 similarly receives the resonance voltage supplied from the secondary side parallel resonance circuit and produces a DC output voltage E02.

The DC output voltage E01 and the DC output voltage E02 are also input to a control circuit 1. Control circuit 1 utilizes the DC output voltage E01 as a detection voltage and utilizes the DC output voltage E02 as an operation power supply therefor.

In insulating converter transformer PIT, the mutual inductance M between the inductance L1 of primary winding N1 and the inductance L2 of secondary winding N2 may have a value +M or a value −M depending upon the relationship between the polarities (winding directions) of primary winding N1 and secondary winding N2 and the connection of rectifier diodes D0 (D01 and D02). For example, if the components are connected in a configuration as shown in FIG. 9A, then the mutual inductance is +M. If the components are connected in a configuration as shown in FIG. 9B, then the mutual inductance is −M.

If this is examined in connection with operation of the secondary side of the circuit of FIG. 7, for example, the operation that rectified current flows through the rectifier diode D01 (D03) when the alternating voltage obtained at the secondary winding N2 has the positive polarity can be regarded as an operation mode of +M (forward mode). On the contrary, the operation that rectified current flows through the rectifier diode D02 (D04) when the alternating voltage obtained at the secondary winding N2 has the negative polarity can be regarded as an operation mode of −M (flyback mode). In other words, the power supply circuit of FIG. 7 operates in the +M/−M mode of the mutual inductance each time the alternating voltage obtained at the secondary winding becomes positive/negative.

In the power supply circuit having the construction described above, power output from the secondary winding side parallel resonance circuit may be increased based upon the supply of power thereto. In this instance, for example, if a full-wave rectifier circuit is connected to the secondary winding side parallel resonance circuit as in the circuit shown in FIG. 7, rectified current flows alternately in both of the +M/−M operation modes of the mutual inductance as described above. In other words, a rectified output from the circuit is obtained within both of the periods within which the alternating voltage is positive and negative. By this described operation, supplied power increases, and also the rate of reaching the maximum load power increases.

The construction for obtaining the full-wave rectification operation illustrated in FIGS. 9A and 9B is realized by forming gap G in insulating converter transformer PIT of FIG. 8 (and FIG. 7) to obtain a loose coupling of a predetermined coupling coefficient to establish a condition wherein the insulating converter transformer is less liable to reach a saturation condition. For example, where gap G is not provided in the insulating converter transformer PIT, there is a high degree of possibility that, upon performance of flyback operation, insulating converter transformer PIT may be put into a saturation condition and operate abnormally. The full-wave rectification operation described above is therefore less likely to be properly preformed in such a saturation condition.

Control circuit 1, shown in FIG. 7, varies the control current (DC current) level supplied to control winding NC in response to the level of the DC output voltage (E01) of the secondary winding side. This supplied current level is adjusted to variably control the inductance LB of drive winding NB wound on the orthogonal control transformer PRT in a feedback control loop-type setup. Consequently, the resonance condition of the series resonance circuit formed of inductance LB of the drive winding NB varies. This variation in turn varies the switching frequency of the switching element Q1 as hereinafter described with reference to FIG. 11, and the secondary winding side DC output voltage is stabilized by the variation of the switching frequency of switching element Q1.

In the power supply circuit shown in FIG. 7, in order to vary the switching frequency, the period within which switching element Q1 is off is fixed whereas the period within which switching element Q1 is on is variably controlled. While employing a constant voltage control, the control operation for the power supply circuit operates to variably control the switching frequency of switching element Q1 to perform resonance impedance control for the switching output, and simultaneously performs continuity angle control (PWM control) of the switching element in a switching period. This composite control operation is realized with a single control circuit system. Here, the switching frequency control is performed such that, when the secondary side output voltage rises as a result of, for example, decreasing of the load thereon, the switching frequency is raised to suppress the secondary winding side output power.

During use, AC switch SW in power supply circuit 700 shown in FIG. 7 is switched from an off-state to an on-state. Charging current then flows into smoothing capacitor Ci through inrush current limiting resistor Ri and bridge rectifier circuit Di so that charging of smoothing capacitor Ci is preformed. This charging continues until the rectified smoothed voltage Ei which is a voltage across smoothing capacitor Ci rises to a level corresponding to the ac input voltage level. Then, when starting current is supplied from the rectified smoothed voltage Ei to the base of switching element Q1 through starting resistor RS, switching element Q1 is turned on to begin oscillation thereof. Thereafter, the switching element Q1 performs a switching operation according to the oscillation thereof.

When this process begins, and $Q_1$ is in the on state, the secondary winding side of insulated converter transformer PIT has a low impedance. An excessively high charging current flows into smoothing capacitors C01 and C02 in which no charge has yet been accumulated. In other words, the secondary winding side DC output voltage is in a transient state until a steady level is obtained, and in this state, control of the switching frequency by the control circuit 1 is not properly preformed. At this time, the switching element Q1 performs a switching operation with the lowest switching frequency which depends upon the time constant of the self-excited oscillation drive circuit (CB and NB).

Therefore, upon startup, the period of switching element Q1 becomes long in accordance with operation of the PWM control described above. The resonance voltage pulse Vcp generated by switching element Q1 within a period within which the switching element Q1 is off therefore becomes excessively high. Consequently, because of excessive inrush current flowing to smoothing capacitors C01 and C02 on the secondary winding side of insulated converter transformer PIT, excessive collector current Icp flows to switching element Q1 in the primary side from the smoothing capacitor Ci through detection winding ND and primary winding N1.

Because a resonance voltage pulse Vcp and collector current Icp of excessively high levels are generated in such a manner upon startup of the circuit, switching element Q1 must be selected to have a high voltage withstanding property and a high current flow capacity to withstand them. A switching element having such characteristics is expensive and large in size, and therefore becomes an obstacle to reducing the cost and miniaturizing the size of the circuit.

Therefore, it is also a common practice to provide an over current limiting circuit in order to allow use of a switching element having a comparatively low voltage withstanding property and current capacity. A construction of a power supply circuit of this type is shown in FIG. 10. It is to be noted that in FIG. 10, like reference characters to those of FIG. 7 denote like elements, and description thereof is omitted herein to avoid redundancy.

The circuit shown in FIG. 10 includes an over current limiting circuit 10 in addition to the circuit described hereinabove with reference to FIG. 7. Over current limiting circuit 10 includes a current detection resistor RE and a series connection circuit of voltage dividing resistors R11 and R12 interposed in parallel to each other between the emitter of switching element Q1 and the primary winding side ground. The base of a transistor Q2, used for conduction control, is connected to a junction between voltage dividing resistors R11 and R12.

The collector of transistor Q2 is connected to the base of switching element Q1 through a diode D10. The anode of the diode D10 is connected to the base of switching element Q1. The cathode of diode D10 is connected to the collector of transistor Q2. The emitter of transistor Q2 is grounded to the primary winding side ground. A capacitor C10, for example, for noise absorption, is connected in parallel between the collector and the emitter of transistor Q2.

In the power supply circuit having the construction shown in FIG. 10, collector current Icp which is generated upon start-up flows from the collector through the emitter of switching element Q1 and is detected by current detection resistor RE and the series connection of voltage dividing resistors R11 and R12. A current level corresponding to a voltage dividing ratio of voltage dividing resistors R11 and R12 flows to the base of transistor Q2. When the level of the collector current Icp of transistor switching element $Q_1$ becomes higher than a certain predetermined level and the base current amount of transistor Q2 also becomes higher than a certain predetermined level, transistor Q2 is rendered conductive thereby to render diode D10 conductive.

When diode D10 and transistor Q2 are conductive, forward current flowing to the base of transistor Q2 flows to the primary winding side ground through diode D10 and transistor Q2 (collector-emitter). In short, the collector current Icp is limited by limiting excessive base current to transistor Q2 upon start-up.

While excessive current can be limited in such a manner, the power supply circuit of FIG. 10 still has the following problems. First, because current detection resistor RE is connected in series to the emitter of switching element Q1, when a load placed thereon is heavy, high power loss occurs and the power conversion efficiency deteriorates. Further, when the power supply circuit shown in FIG. 10 is to be actually designed, a margin must be provided against a malfunction when the ac input voltage VAC rises high or against a malfunction which arises from a variation of some component of the over current limiting circuit, even upon steady operation, so that the malfunction does not occur.

FIGS. 11A to 11D are waveform diagrams illustrating operation of the power supply circuit of FIG. 10 which is designed to include a margin against a malfunction. Particularly, FIGS. 11A and 11B show waveforms of the resonance voltage Vcp and the collector current Icp, respectively, when the maximum load power Pomax is 150 W and the ac input voltage VAC is 120 V. FIGS. 11C and 11D show waveforms of the resonance voltage Vcp and the collector current Icp, respectively, in a steady state condition.

The switching frequency of switching element Q1 is controlled so as to be lower in a maximum load power operation condition than in a steady state operation. Switching element Q1 is thus controlled such that, while the period TOFF within which the switching element Q1 is off is fixed, the period TON within which the switching element Q1 is on increases. Actually, in the maximum load power operation condition illustrated in FIGS. 11A and 11B, the period TOFF is 2 microseconds, and the period TON is 9 microseconds.

In FIGS. 11A to 11D, the resonance voltage Vcp is 700 Vp (FIG. 11C) during steady state operation, but rises up to 900 Vp (FIG. 11A) in a maximum load power operation condition. Meanwhile, the collector current Icp is 4.5 Ap (FIG. 11D) in steady state operation, but rises up to 6.5 Ap (FIG. 11B) in a maximum load power operation condition. The resonance voltage Vcp and the collector current Icp in a maximum load power operation condition exhibit arise of approximately 20% to 30% from the levels exhibited in steady state operation. Thus, switching element Q1 must be able to withstand the voltage of 900 Vp. Actually, however, a device having a voltage withstanding property against 1,200 V is selected for the switching element Q1 to provide an additional appropriate margin against malfunction. A device having a voltage withstanding property against 1,200 V is comparatively expensive and large in size.

In short, even if an over current limiting circuit, such as that shown in FIG. 10 is provided to suppress a possible application of too much current upon the application of a heavy load, a device having a corresponding high voltage withstanding property must be selected for the switching element. Consequently, the circuit cannot be reduced in cost or size.

Further, because the circuit construction shown in FIG. 10 does not involve particular control for a rise of the secondary side DC voltage upon start-up of the circuit, the rise time of the secondary side DC output voltage level is correspondingly short. Therefore, the power supply circuit of FIG. 10 has a problem also in that a margin against a malfunction of the circuit upon startup cannot be provided.

DISCLOSURE OF THE INVENTION

It is therefore an object of the invention to provide an improved switching power supply circuit.

It is a further object of the invention to provide an improved switching power supply circuit wherein a switching element having a comparatively low voltage withstanding property and a low current capacity can be selectively used and the switching power supply circuit can be produced with low cost and with a small size.

Still other objects and advantages of the invention will in part be obvious and will in part be apparent from the specification and the drawings.

Generally speaking, in accordance with the invention, an improved switching power supply circuit is provided, comprising a rectifier smoother for receiving a commercial ac power supply as an input thereto, for producing a rectified smoothed voltage from the inputted coimimnercial ac power supply, and for outputting the rectified smoothed voltage as a DC input voltage. A switcher including a switching element for receiving and switchably outputting the DC input voltage is also provided. The switching element includes a self-excited oscillation drive circuit for switchably driving the switching element in a self-excited manner, an insulating converter transformer for transmitting the output of the switching element to a secondary winding side of the circuit, a primary winding side resonance circuit formed from at least a leakage inductance component including a primary winding of the insulating converter transformer and a capacitance of a resonance capacitor for providing resonance type operation of the switching element. The switcher further includes a secondary winding side resonance circuit formed from the leakage inductance component of the secondary winding of the insulating converter transformer and the capacitance of a secondary winding side resonance capacitor. A DC output voltage producer is also provided, including the secondary winding side resonance circuit, for receiving an alternating voltage obtained at the secondary winding of the insulating converter transformer as an input thereto, and for performing a full-wave rectification operation for the input alternating voltage to produce a secondary winding side DC output voltage. A switching frequency varying element is provided for varying an inductance of the self-excited oscillation drive circuit in response to a control current level supplied thereto to vary a switching frequency of the switching element. A constant voltage controller for varying the control current in response to the level of the secondary winding side DC output voltage and supplying the varied control current to the switching frequency variation means to variably control the switching frequency thereby to effect constant voltage control for the secondary side DC output voltage in a feedback control type setup is also provided. A switching frequency controller is provided for receiving a start-up power supply upon or immediately after start-up of the switching power supply circuit as an input thereto, and for supplying the control current of a predetermined level over a predetermined period of time after start-up in place of a control current supplied by the constant voltage controller to control the switching frequency so that the switching frequency remains within a predetermined desired range.

For example, in a self-excited composite resonance switching converter, within a transient period until the secondary winding side DC output voltage is stabilized at its steady-state level after start-up of the power supply, it is not possible to control the switching frequency appropriately to stabilize the same using the standard switching control used at steady-state. Therefore, the switching frequency controller operates upon start-up or immediately after start-up of the power supply circuit so that the switching frequency thereof remains within a predetermined required range. In this manner, the switching frequency is controlled so that the secondary winding side DC output voltage level may be suppressed as in the switching power supply circuit of the present invention. Thus, a sudden rise of the secondary side DC output voltage upon start-up is suppressed, and a soft start-up is realized.

More specifically, in the switching power supply circuit according to the invention, a composite resonance switching converter is provided with a switching element that is driven by self-excited oscillation, and includes a soft start-up circuit (switching frequency control means) so that, upon start-up of a switching operation, the switching frequency is raised up to a frequency substantially near to an upper limit of an allowable range of variation of the switching frequency to suppress a sudden rise of the secondary winding side DC power output.

As a result, because the resonance voltage applied to the switching element, and therefore the switching output current (collector current) flowing to the switching element upon start-up of a switching operation are suppressed, a device having a comparatively low voltage withstanding property and having a comparatively low current capacity can be selectively used for the switching element. Consequently, the switching power supply circuit can be produced at a low cost and in a small size.

Further, it is not required for the switching power supply circuit of the invention to include a separate circuit for limiting over current to the switching element. Consequently, power loss which might otherwise occur when using a separate current limiting circuit is eliminated.

Preferably, the switching power supply circuit in accordance with the invention further comprises a tertiary winding wound at a position on the primary winding of the insulating converter transformer spaced by more than a predetermined physical distance from the secondary winding, and a rectifier smoothing circuit connected to the tertiary winding. The starting power supply which is supplied to the switching frequency controller is a DC voltage obtained by the rectifier smoothing circuit. According to this preferred start-up circuit, the soft start-up circuit (switching frequency controller) can be operated by the tertiary winding and the rectifier smoothing circuit which have a single independent construction.

Alternatively, the switching power supply circuit may further comprise a standby power supplier for receiving the commercial ac power supply as an input thereto and producing a DC voltage as a standby power supply voltage from the input commercial ac power supply. A switching starter may also be provided for making use of the standby power supply voltage to produce a switching starting signal which can be used to start the switcher. The switching starting signal is used as the starting power supply to be supplied to the switching frequency controller. With such a switching power supply circuit, a tertiary winding as described above need not be provided, and an insulating converter transformer having an ordinary simple construction can be used for the insulating converter transformer.

In the switching power supply circuit according to the present invention, the period within which the soft start-up circuit (switching frequency controller) operates depends upon a time constant provided by the capacitance of, for example, a capacitor connected to the base of a transistor of the soft start-up circuit and a resistance component of a control winding to which control current is supplied. This signifies that the operation period of the soft start-up circuit can be set variably if the capacitance of the capacitor or the resistance component of the control winding is varied.

Thus, preferably the switching power supply circuit further comprises an operation period setter for variably setting an operation period of the switching frequency controller. Where the operation period of the soft start-up circuit is variably set in this manner, the time until the secondary winding side output voltage rises to its steady level can be set arbitrarily. Consequently, the margin against a malfunction when starting the power supply can be increased advantageously.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIGS. 11A to 11D are waveform diagrams illustrating switching operation of the standard power supply circuit shown in FIG. 10.

BEST MODE FOR CARRYING OUT THE INVENTION

Figure 1:
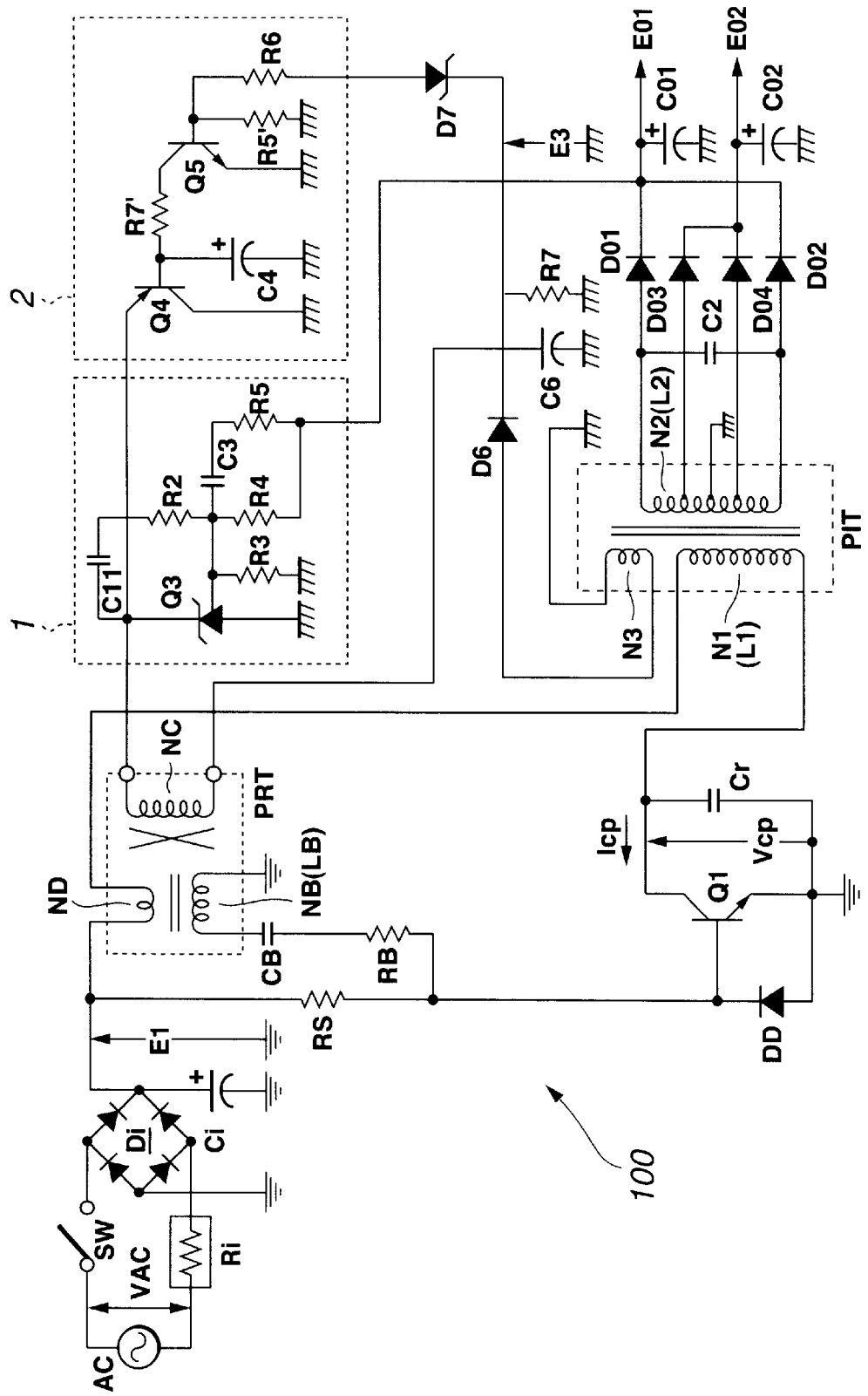
FIG. 1 is a circuit diagram depict a power supply circuit constructed in accordance with the invention.
Figure 7:
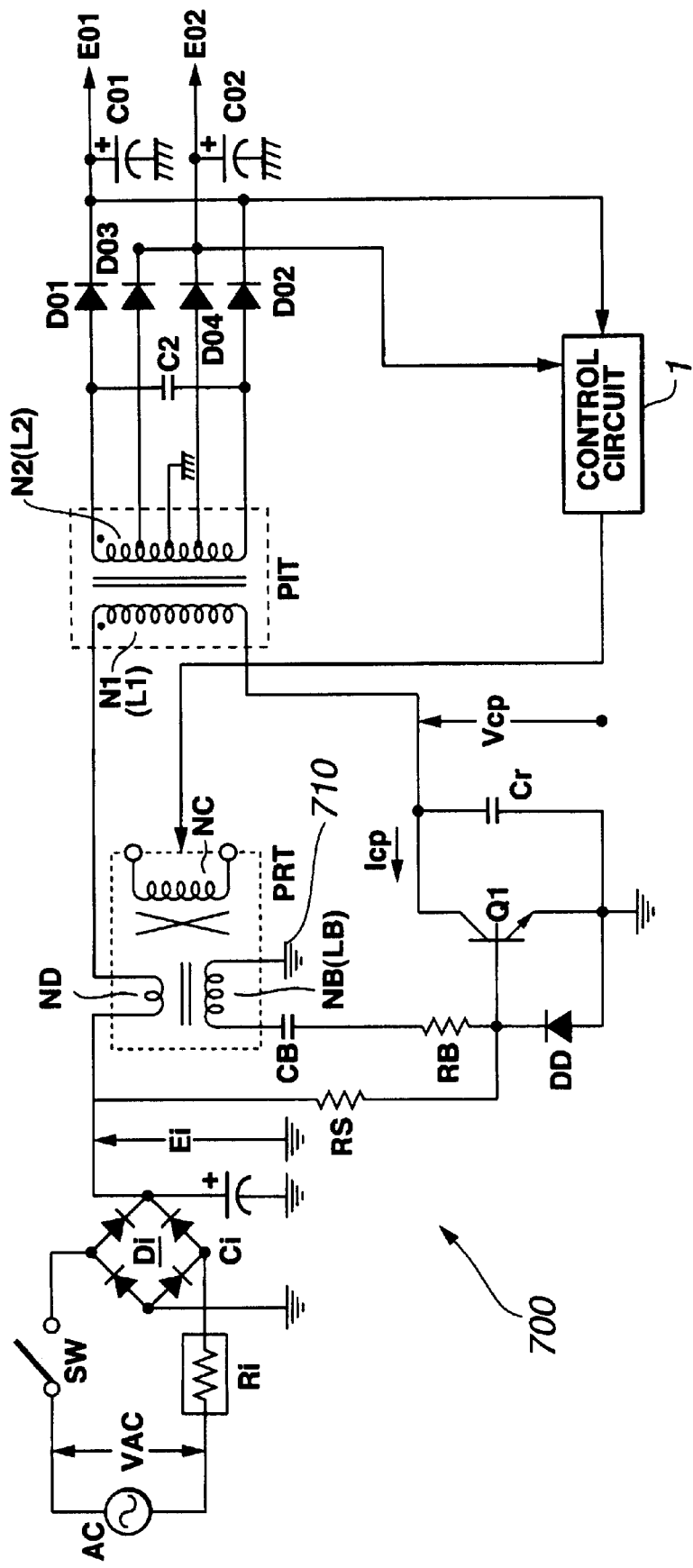
FIG. 7 is a circuit diagram showing a construction of a standard power supply circuit.

Referring first to FIG. 1, a power supply circuit 100 constructed in accordance with the invention is shown. Power supply circuit 100 includes several components common with those of the standard power supply apparatus described above with reference to FIG. 7. Description of such common components is omitted herein to avoid redundancy, like elements being designated by like reference numerals.

Power supply circuit 100 first includes a control circuit 1. Control circuit 1 includes a pair of resistors R3 and R4 connected in series between a DC output voltage E01 and a secondary winding side ground. A shunt regulator Q3 is provided with a control terminal connected to a junction (voltage dividing point) between resistors R3 and R4. The anode of shunt regulator Q3 is grounded, and the cathode of shunt regulator Q3 is connected to a line of a DC voltage E3 through a control winding NC of an orthogonal control transformer PRT, described below. The cathode of shunt regulator Q3 is connected to the junction between resistors R3 and R4 through a series connection of a capacitor C11 and a resistor R2. Further, a series connection circuit of a capacitor C3 and a resistor R5 is connected in parallel to resistor R4.

Control circuit 1 functions as an error amplifier which receives DC output voltage E01 as a detection input thereto. In particular, a voltage obtained by voltage division of the DC output voltage E01 by means of resistors R3 and R4 is input to the control terminal of shunt regulator Q3. Accordingly, shunt regulator Q3 supplies current of a level corresponding to the DC output voltage E01 to control winding NC. The level of the control current to flow through control winding NC is therefore variably controlled. Accordingly, the switching frequency of switching element Q1 is varied to execute constant voltage control as described above with reference to FIG. 7.

Power supply circuit 100 further includes a soft start-up circuit 2 and a rectifier circuit for producing a DC voltage E3 for driving the soft start-up circuit 2. A construction of the rectifier circuit for producing the DC voltage E3 will be first described.

The rectifier circuit includes a tertiary winding N3 wound on an insulating converter transformer PIT, a diode D6, and a smoothing capacitor C6 for half-wave rectifying an alternating voltage excited in tertiary winding N3. Accordingly, DC voltage E3 is obtained across smoothing capacitor C6. A resistor R7 is connected in parallel to smoothing capacitor C6. DC voltage E3 across smoothing capacitor C6 is supplied as a detection voltage (operating power supply) to soft startup circuit 2 through a Zener diode D7. Zener diode D7 is set, for example, in combination with resistor R7 connected in parallel to smoothing capacitor C6, so as to become conducting with a reverse voltage corresponding to 18 V.

Figure 2:
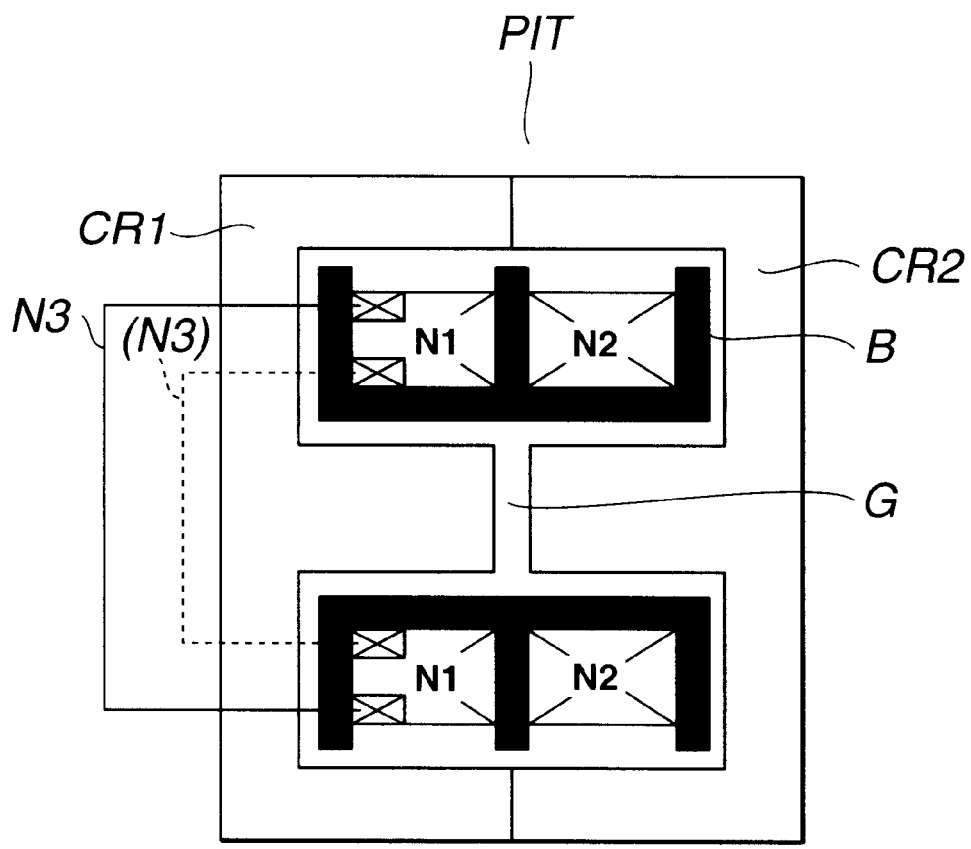
FIG. 2 is a side elevational sectional view showing a structure of an insulating converter transformer of the invention provided in the power supply circuit of FIG. 1.

Referring next o FIG. 2, a structure of an insulating converter transformer PIT on which tertiary winding N3 is wound is shown. Portions of the insulating converter transformer PIT shown in FIG. 2 are constructed similarly to those in insulating converter transformer PIT described above in reference to FIG. 8. Thus, a gap G is formed between the middle magnetic legs thereof so that a loose coupling having a coupling coefficient of, for example, approximately 0.85 may be obtained. Also, the mounting structures of primary winding N1 and secondary winding N2 are similar to those in FIG. 8.

Figure 8:
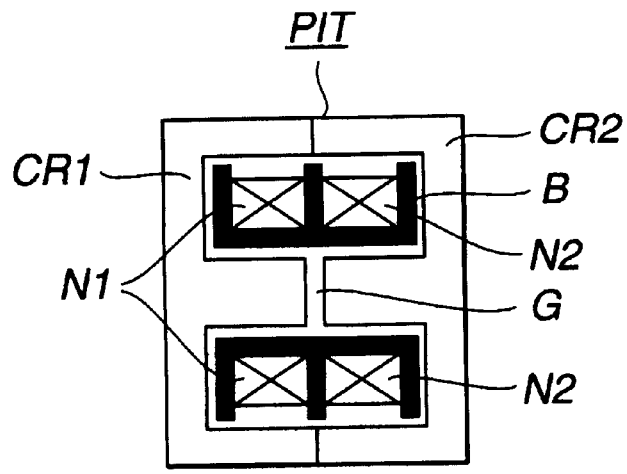
FIG. 8 is a sectional view showing a structure of a standard insulating converter transformer of the power supply circuit of FIG. 7.
Figure 9A:
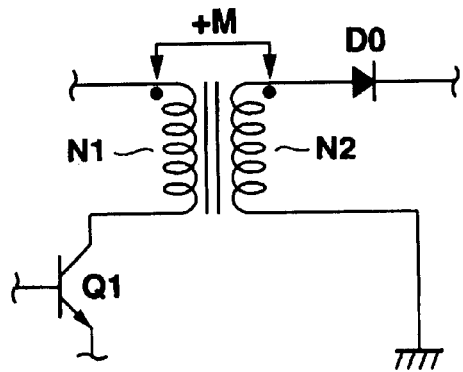
FIGS. 9A and 9B are circuit diagrams illustrating operations of the standard insulating converter transformer shown in FIG. 8 when the mutual inductance is +M and −M, respectively.
Figure 9B:
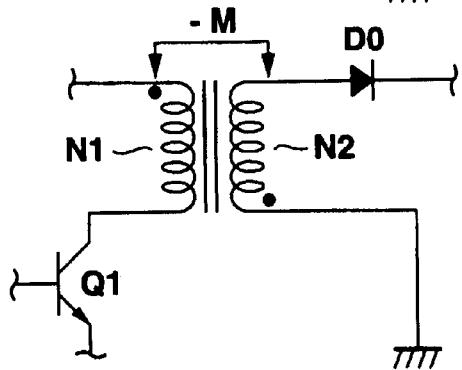

However, insulating converter transformer PIT shown in FIG. 2 is different from the insulating converter transformer of FIG. 8 in that tertiary winding N3 is additionally wound, for example, as shown in FIG. 2, at a position on the outer side (upper side) of a split bobbin B adjacent the primary winding N1 and farthest from the secondary winding N2. Alternatively, tertiary winding N3 may be wound at a position on the center side (lower side) of the split bobbin B farthest from the secondary winding N2 as indicated as (N3) in FIG. 2. For tertiary winding N3, for example, a triple insulating line is adopted.

Tertiary winding N3 is wound at a position farthest from secondary winding N2 so that the coupling degree of tertiary winding N3 to secondary winding N2 is minimized. If too much coupling is present, the level of DC voltage E3 upon start-up of the power supply may exceed a steady voltage as will be described below making reference to FIG. 4. Only if a coupling degree below a particular level can be obtained can the tertiary winding N3 be wound at a particular position, for example, nearer to secondary winding N2 than the position shown in FIG. 2.

Soft start-up circuit 2 shown in FIG. 1 has the following construction. A pair of resistors R6 and R5' are connected between the anode side of Zener diode D7 to which the DC voltage E3 is applied and the secondary winding side ground. The base of a transistor Q5 (NPN) is connected to the junction between resistors R6 and R5'.

The collector of transistor Q5 is connected to the base of a transistor Q4 through a resistor R7'. Further, a capacitor C4 for adjusting the base potential applied to transistor Q4 is interposed in parallel between the base of transistor Q4 (PNP) and the secondary winding side ground. The emitter of transistor Q4 is connected to a junction between control winding NC of orthogonal control transformer PRT and the cathode of shunt regulator Q3. The collector of transistor Q4 is connected to the secondary winding side ground.

Figure 3:
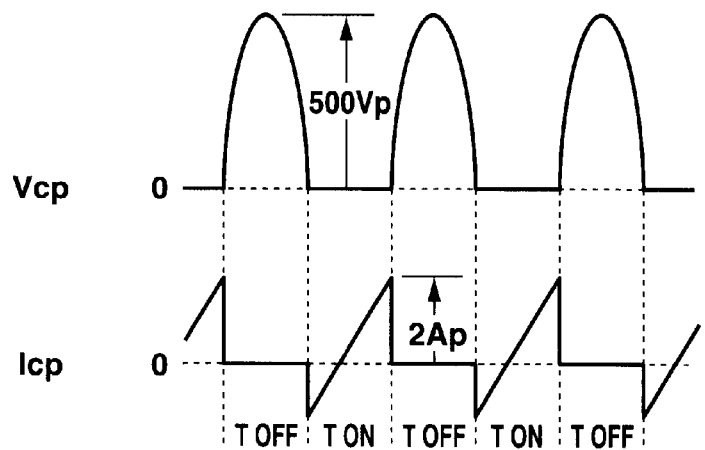
FIGS. 3A and 3B are waveform diagrams illustrating a switching operation of the power supply circuit of FIG. 1.

Operation of soft start-up circuit 2 will now be described making reference to FIGS. 3A, 3B and 4. FIGS. 3A and 3B illustrate a resonance voltage Vcp and a parallel collector current Icp corresponding, for example, to a switching operation of switching element Q1 approximately 20 ms after an AC switch SW is switched on in FIG. 1.

Figure 4:
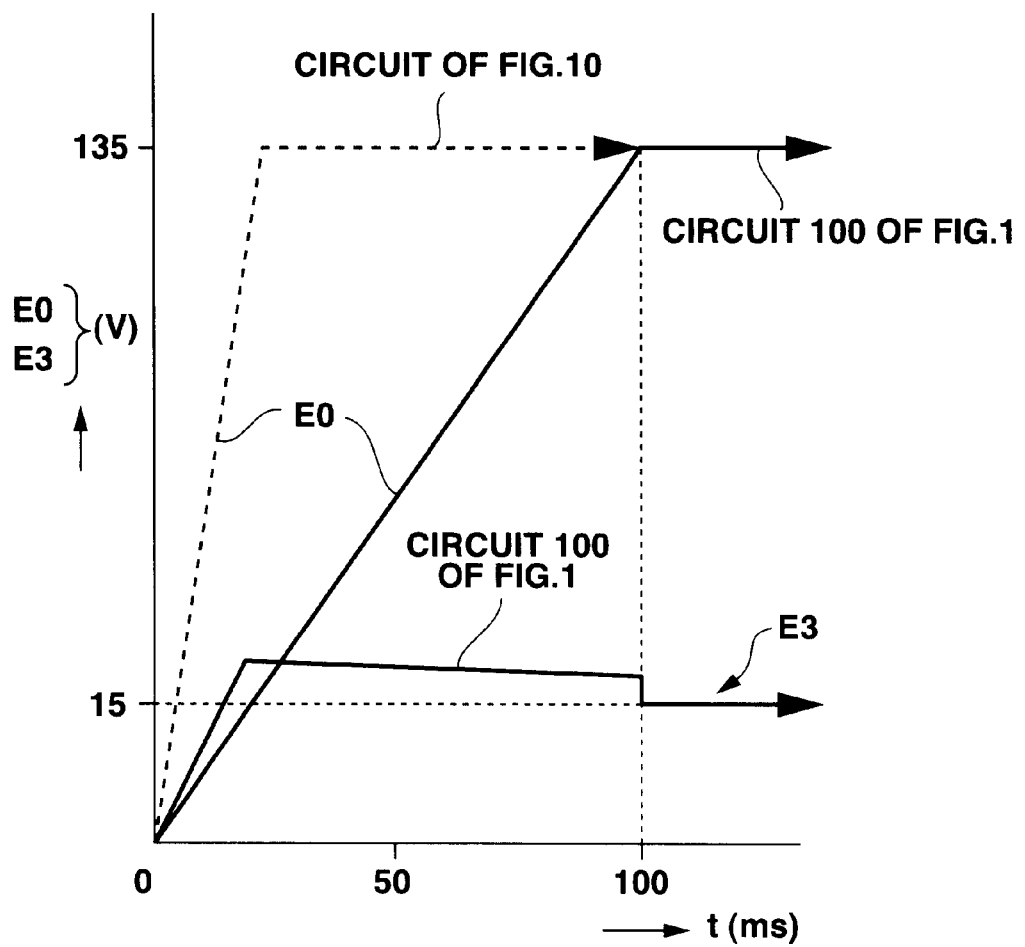
FIG. 4 is a diagram comprising a soft start-up operation of the power supply circuit of FIG. 1 of the invention and operation upon start-up of a conventional power supply circuit.

FIG. 4 illustrates level variations of the secondary side DC output voltage E0 (E01) and the DC voltage E3 upon start-up. In FIG. 4, the x-axis indicates the time after AC switch SW is switched on and the y-axis indicates the voltage level. After AC switch SW is switched on, DC voltage E3 rises as shown in FIG. 4, and approximately after the lapse of 20 ms, a level (18 V or more) higher than 15 V, which is to be the resulting steady state voltage level, is obtained. This operation arises from the tertiary winding N3 wound in such a manner as described above in FIG. 2.

When DC voltage E3 becomes 18 V or more as described above, the Zener diode D7 is rendered conducting. Consequently, DC voltage E3 is divided by voltage dividing resistors R6 and R5' in soft start-up circuit 2, and current of a level corresponding to the divided voltage level flows to the base of transistor Q5. Consequently, transistor Q5 is rendered conducting, and collector current of transistor Q5 flows as base current to the base of transistor Q4 through the resistor R7'. Consequently, transistor Q4 is rendered conductive between the emitter and the collector thereof At this time, secondary winding side DC output voltage E0 is in a transition period within which it rises toward 135 V which is the steady state level thereof as shown in FIG. 4. Control circuit 1 is not operating during this time.

Accordingly, when approximately 20 ms elapses after AC switch SW is switched on, emitter current of transistor Q4 of soft start-up circuit 2 flows to control winding NC of orthogonal control transformer PRT. Control circuit 1 of power supply circuit 100 of FIG. 1 controls so that the switching frequency rises as the level of the control current flowing through control winding NC increases. Accordingly, as the emitter current of transistor Q4 of soft start-up circuit 2 flows to control winding NC, control current of a sufficiently high level flows to control winding NC. The switching frequency of switching element Q1 is controlled so that approximately 20 ms after AC switch SW is switched on, the switching frequency is adjusted, for example, up to approximately 250 KHz which is the highest frequency within a predetermined allowable range of switching frequency variation.

Operation of switching element Q1 20 ms after AC switch SW is switched on is illustrated in the waveform diagrams of FIGS. 3A and 3B. In particular, as can be seen from the waveforms of the resonance voltage Vcp of FIG. 3A and the collector current Icp of FIG. 3B, switching element Q1 performs a switching operation in a cycle of the period TOFF=period TON=2 microseconds. Because the switching operation is performed with a high switching frequency (250 KHz) in this manner, the resonance voltage Vcp obtained when the switching element Q1 is off (within the period TOFF) is controlled to be approximately to 500 Vp as seen from FIG. 3A, and the parallel collector current Icp obtained when switching element Q1 is on (within the period TON) is 2 Ap.

Thereafter, charging of capacitor C4 is preformed in accordance with a time constant provided by the capacitance thereof Capacitor C4 is connected to the base of transistor Q4 and a DC resistance component of control winding NC. This acts to raise the base potential of transistor Q4. As the base current level of transistor Q4 drops, the control current (emitter current) flowing through the control winding NC decreases and the switching frequency of switching element Q1 gradually drops.

In short, the power supply circuit of FIG. 1 performs control so that approximately 20 ms after AC switch SW is switched on by operation of soft start-up circuit 2, the switching frequency is raised compulsorily, and thereafter, the switching frequency is dropped gradually. Consequently, as can be recognized from comparison of the variations of the secondary side DC output voltage E0 by the power supply circuit of FIG. 1 according to the present invention indicated by a solid line in FIG. 4 and the power supply circuit of FIG. 10 indicated by a broken line in FIG. 4, the power supply circuit of FIG. 1 operates so that the time until the secondary side DC output voltage E0 rises to its steady-state level (135 V) upon start-up is longer.

Figure 10:
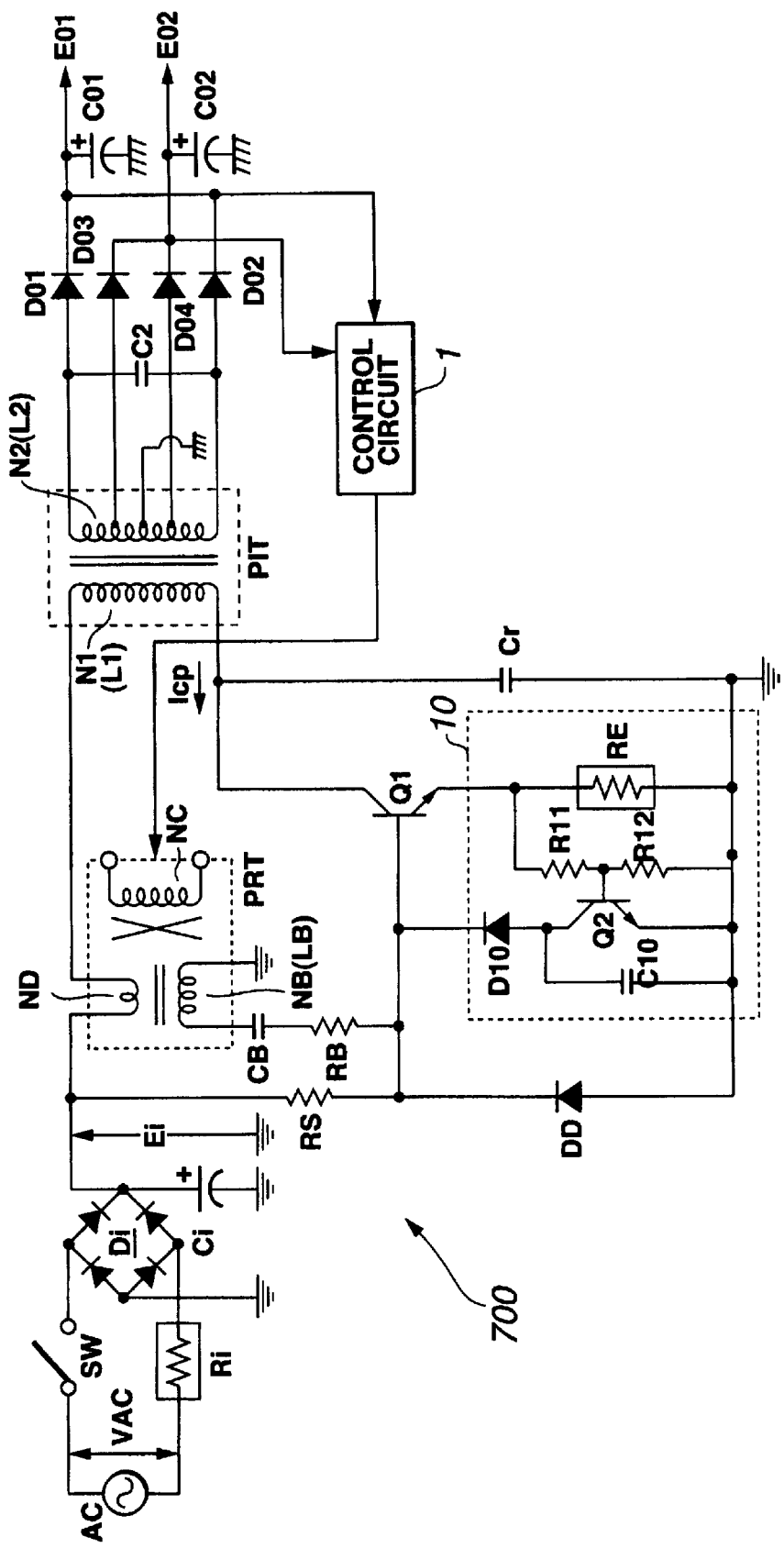
FIG. 10 is a circuit diagram showing a construction of a standard power supply circuit which includes an over current limitation circuit.

From FIG. 4, it can be seen that power supply circuit 100 of FIG. 1 is set so that the rise time of the secondary winding side DC output voltage E0 from power supply circuit 100 of FIG. 1 is approximately five times the rise time of the power supply circuit of FIG. 10. In particular, while the power supply circuit of FIG. 10 reaches its steady-state level at approximately 20 ms after the AC switch SW is switched on, power supply circuit 100 of FIG. 1 is controlled so that its steady-state level is reached approximately 100 ms after AC switch SW is switched on. Because control circuit 1 operates properly when secondary winding side DC output voltage E0 returns to its steady level approximately 100 ms after AC switch SW is switched on, the switching frequency control operation for the switching element Q1 is passed from soft start-up circuit 2 to control circuit 1. Further, at this point of time, because DC voltage E3 returns to 15 V, its steady level, Zener diode D7 is rendered non-conducting. Accordingly, operation of soft start-up circuit 2 is also stopped.

In the power supply circuit according to the invention, a soft start-up operation upon start-up of a power supply is realized. According to this soft start-up operation, the resonance voltage $V_{cp}$ upon start-up is controlled to 500 Vp with the power supply circuit of FIG. 1, while in a conventional power supply circuit, the resonance voltage $V_{cp}$ upon start-up is 900 VP to 1,000 $V_p$ with the power supply circuit of FIG. 10. Also collector current level upon start-up is controlled to be 2 Ap according to the power supply circuit of FIG. 1 of the invention while this level may rise to 6.5 Ap with the power supply circuit of FIG. 10.

Consequently, a device having a voltage withstanding property of only 700 V and having a comparatively small current capacity can be employed for switching element Q1 of the power supply circuit of FIG. 1. An inexpensive device of a comparatively small size can therefore be produced. Additionally, the capacitor Cr on the primary winding side of the circuit can employ a device able to withstand only approximately 800 V.

In the power supply circuit of FIG. 1, the time for transition after a soft startup operation until reaching steady state operation depends upon the time constant provided by capacitor C4 in soft start-up circuit 2, and control winding NC. The time for transition after a soft start-up operation until reaching a steady-state operation can be set arbitrarily by adjusting at least one of, for example, the capacitance of capacitor C4 and the DC resistance component (turn number) of control winding NC. Accordingly, a malfunction margin upon start-up can be increased by adjustment of the time constant. Because the DC resistance component (turn number) of control winding NC is principally set depending upon a control characteristic of the orthogonal control transformer PRT, preferably the capacitance of capacitor C4 is varied.

Figure 5:
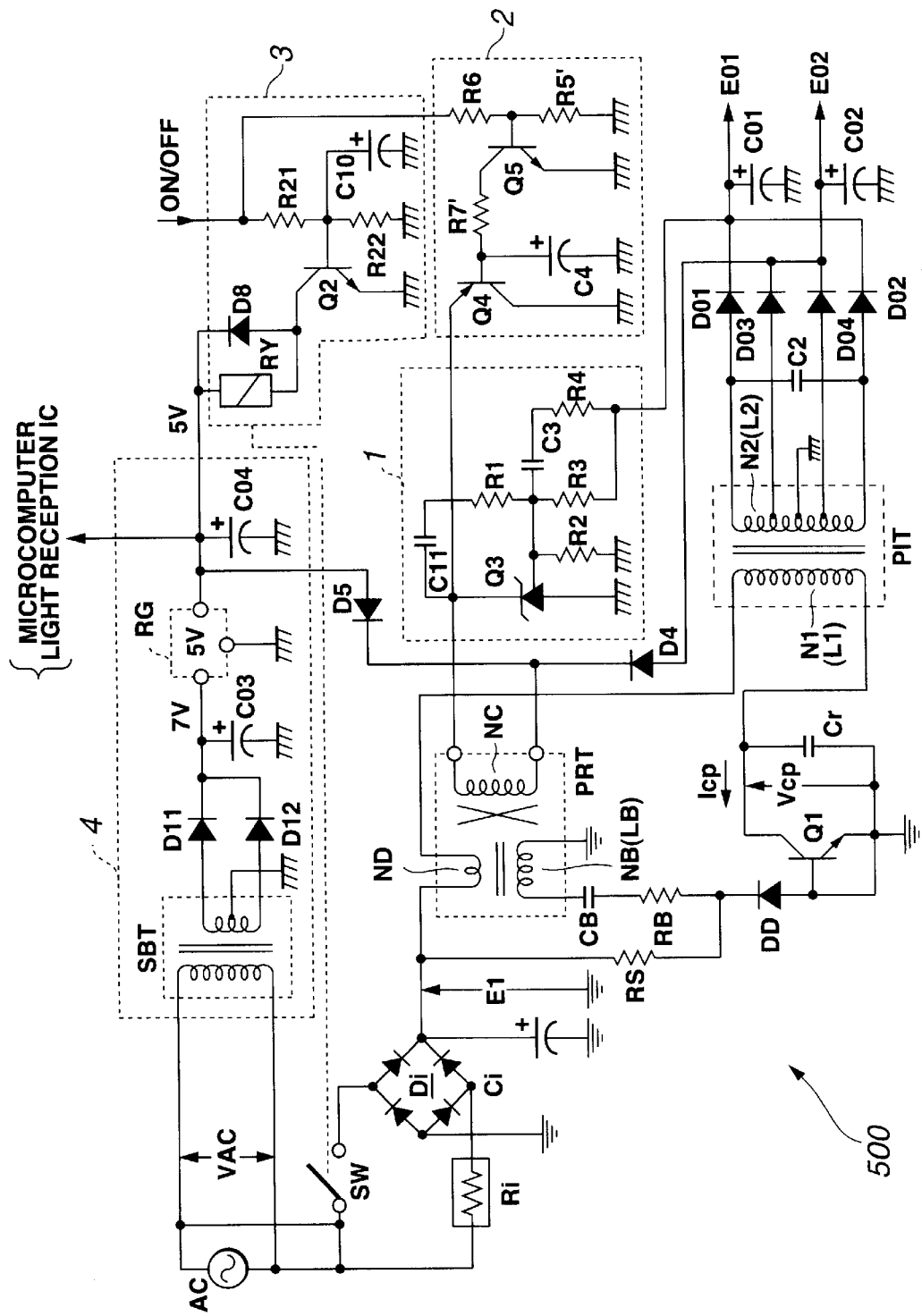
FIG. 5 is a circuit diagram showing a construction of an alternative embodiment of the invention.

FIG. 5 shows another power supply circuit 500 constructed in accordance with an alternative embodiment of the invention. Power supply circuit 500 is a modification of the power supply circuit 100 described in reference to FIG. 1 in that it additionally includes a standby power supply circuit 4. Power supply circuit 500 shown in FIG. 5 is therefore practically more advantageous than power supply circuit 100 of FIG. 1.

Standby power supply circuit 4 of FIG. 5 includes a standby transformer SBT which also receives ac input voltage VAC. Standby transformer SBT includes a secondary winding, a pair of rectifier diodes D11 and D12 and a smoothing capacitor C03 connected in such a manner as shown in FIG. 5 to form a center tap type full-wave rectifier circuit. Standby transformer SBT produces a rectified smoothed voltage of, for example, 7 V using ac input voltage VAC input to the primary side thereof The rectified smoothed voltage of 7 V is supplied to a regulator RG. The regulator RG stabilizes the input voltage of 7 V and outputs a stabilized voltage of 5 V. The stabilized DC voltage of 5 V is obtained as a voltage across a smoothing capacitor C04. The DC voltage of 5 V is supplied as a standby power supply voltage and as an operation power supply, for example, for a microcomputer, an IC for reception of infrared rays and so forth included in the apparatus. DC voltage of 5 V is supplied also as an operation power supply for a relay drive circuit 3. Relay drive circuit 3 is provided to control an on/off operation of AC switch SW with an on/off control signal for the main power supply circuit output under the control of, for example, the microcomputer. To this end, an electromagnetic relay RY of the relay drive circuit 3 operates in association with an on/off operation of AC switch SW.

In power supply circuit 500, the on/off control signal for the main power supply circuit is a DC voltage having a level higher than a predetermined level to drive relay drive circuit 3 and soft start-up circuit 2 in such a manner as described below. Then, when the main power supply circuit is to be turned on, the DC voltage mentioned above is output, but when the main power supply circuit is to be turned off, the output of the DC voltage is stopped. The DC voltage as the on/off control signal for the main power supply circuit is obtained, though not shown in FIG. 5, by the microcomputer making use of the DC voltage of 5 V produced by standby power supply circuit 4.

In relay drive circuit 3, a pair of voltage dividing resistors R21 and R22 are interposed between the line for the on/off control signal for the main power supply circuit and the secondary winding side ground. The base of a transistor Q2 is connected to a junction between voltage dividing resistors R21 and R22. A capacitor C10 is connected between the base of the transistor Q2 and the secondary winding side ground.

The collector of transistor Q2 is connected to the DC voltage line of 5 V obtained from standby power supply circuit 4 through electromagnetic relay RY. The emitter of transistor Q2 is grounded to the secondary winding side ground. A protecting diode D8 is connected in a direction shown in FIG. 5 to electromagnetic relay RY.

Further, in power supply circuit 500, the on/off control signal for the main power supply circuit is input as a detection voltage to soft start-up circuit 2. In soft start-up circuit 2 shown in FIG. 5, the DC voltage level as the on/off control signal is divided by the voltage dividing resistors R6 and R5' to perform detection thereby to effect conduction control of transistors Q5 and Q4. Accordingly, in power supply circuit 500, the tertiary winding N3 used in the power supply circuit of FIG. 1 is not required. Consequently, the insulating converter transformer PIT of FIG. 8 can be used as the insulating converter transformer in power supply circuit 500.

A diode D5 shown in FIG. 5 forms a path from the power supply for operating control circuit 1 upon soft start-up. The anode of diode D5 is connected to the DC voltage line of 5 V of the standby power supply circuit 4. The cathode of diode D5 is connected to the cathode of shunt regulator Q3 through control winding NC. A diode D4 forms a path from the power supply for operating control circuit 1 during steady operation after soft start-up. The anode of diode D4 is connected to the line for the secondary winding side DC output voltage E02 of the main power supply circuit while the cathode of diode D4 is connected to the cathode of shunt regulator Q3 through control winding NC. During use, if a DC voltage is output as the on/off control signal for turning the main power supply on, then transistor Q2 of relay drive circuit 3 is rendered conductive, thereby to drive electromagnetic relay RY. Consequently, the AC switch SW is switched on, and power supply to the main power supply side is started.

The DC voltage as the on/off control signal is input also to the series connection circuit of resistors R6 and R5' of soft start-up circuit 2. Consequently, transistors Q5 and Q4 are rendered conducting, and control current flows to the control winding NC as described above.

Figure 6:
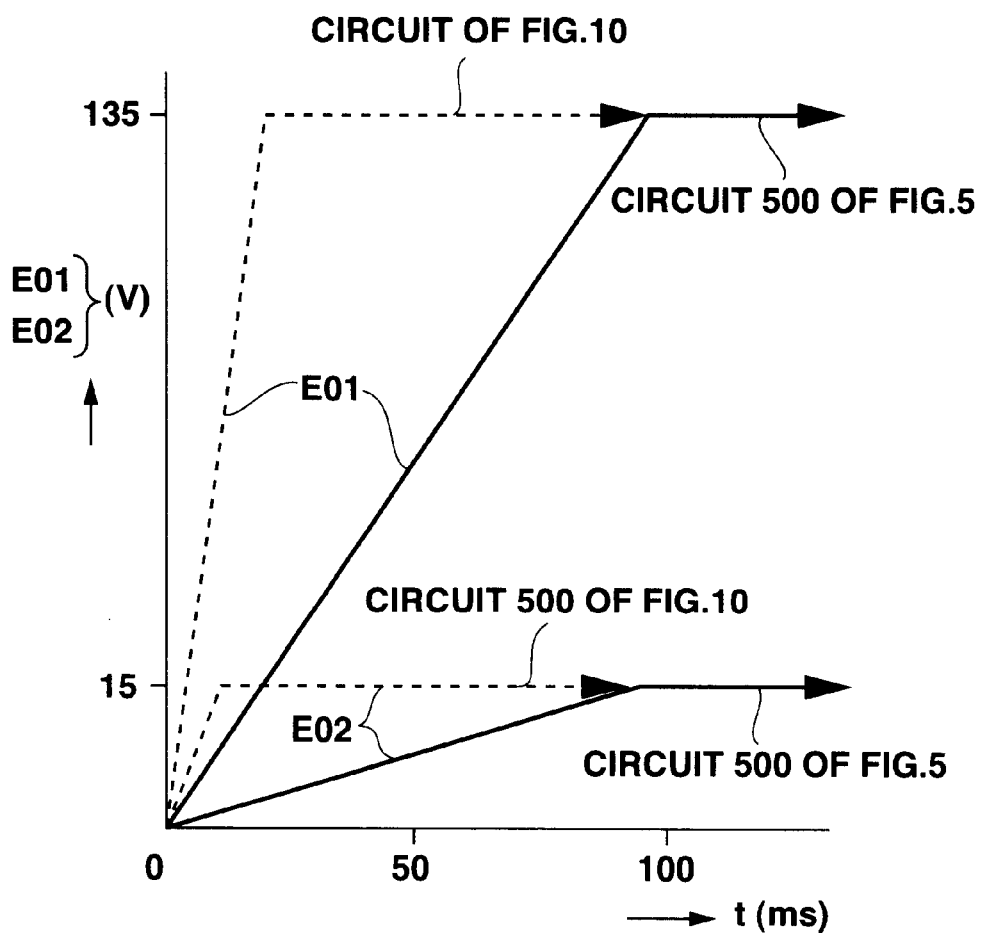
FIG. 6 is a diagram view comparing a soft start-up operation of the power supply circuit of FIG. 5 of the invention and operation upon start-up of a standard power supply circuit.

The switching frequency of switching element Q1 is controlled so that it rises substantially up to the highest frequency level (250 KHz) within an allowable variation control range in a similar manner as in the power supply circuit of FIG. 1 described above. Thus, secondary side DC output voltages E0 (DC output voltage E01 and E02) do not reach their steady levels too quickly with a steep slope of increase. The controlling condition in this instance is shown in FIG. 6. Level variations of the secondary winding side DC output voltages E0 (DC output voltage E01 and E02) upon start-up are shown. As is seen from FIG. 6, a time of approximately 100 ms is required after AC switch SW is switched on until the DC output voltages E01 and E02 reach their respective steady-state levels (here, DC output voltage E01=135 V and E02=15 V).

An operation similar to that described above with reference to the waveform diagrams of FIGS. 3A and 3B is obtained as the switching operation of switching element Q1 immediately after startup. Accordingly, a device able to withstanding a voltage of 700 V and having a comparatively small current capacity can be employed for switching element Q1. Also a device able to withstand a voltage of approximately 800 V can be selectively used for parallel resonance capacitor Cr. Further, by adjusting at least one of the capacitance of capacitor C4 and the DC resistance component (turn number) of control winding NC, a malfunction margin upon starting of power supply can be set similarly as in the power supply circuit of FIG. 1.

The switching power supply circuit of the present invention is not limited to the specific forms described hereinabove but may have various forms. For example, detailed constructions of the control circuit 1, soft start-up circuit 2, relay drive circuit 3 and so forth of the power supply apparatus described hereinabove with reference to FIGS. 1 and 5 may be modified suitably.

Further, while also a push-pull type voltage resonance converter wherein two switching elements are turned on/off alternately is known, the present invention can be applied also to a self-excited voltage resonance converter which employs the push-pull system.

Furthermore, while also a composite resonance switching converter wherein a resonance capacitor is connected in series to the secondary winding of insulating converter transformer PIT to form a secondary side series resonance circuit has been proposed by the assignee of the present application, the present invention can be applied also to a composite switching converter of the type just described.

Further, while a voltage resonance converter is used in the power supply circuit described hereinabove with reference to FIGS. 1 and 5, the present invention can be applied also to a power supply circuit in which a current resonance converter wherein stabilization is performed by self-excited switching frequency control is provided on the primary side.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

INDUSTRIAL APPLICABILITY

As described above, a switching power supply circuit according to the present invention allows selective use of a switching element having a comparatively low voltage withstanding property and a low current capacity and can be produced in a low lost and with a small size. Upon starting of power supply, the switching frequency of the switching element is raised by a soft starting circuit to increase a period of time until a secondary side DC output voltage reaches a steady level thereof As a result, the levels of a resonance voltage and a collector current obtained when the switching element starts its switching operation are suppressed.

What is claimed is:

1. A switching power supply circuit, comprising:
   rectifier smoothing means for receiving a commercial ac power supply as an input and producing and outputting a rectified smoothed DC voltage;
   switching means for providing a switched output, said switching means comprising:
      a switching element for receiving and switchably outputting the DC voltage;
      a self-excited oscillation drive circuit for switchably driving said switching element in a self-excited manner;
      an insulating converter transformer for transmitting the output of said switching means to a secondary winding side of said switching power supply circuit;
      a primary winding side resonance circuit formed at least from a leakage inductance component including a primary winding of said insulating converter transformer and a capacitance of a resonance capacitor, said primary winding side resonance circuit operating said switching means in a resonance type operation; and
      a secondary winding side resonance circuit formed on the secondary winding side of said switching power supply circuit, including a leakage inductance component of a secondary winding of said insulating converter transformer and a capacitance of a secondary side resonance capacitor;
   DC output voltage production means, including said secondary side resonance circuit, for receiving an alternating voltage obtained at said secondary winding of said insulating converter transformer as an input thereto and performing a full-wave rectification operation for the input alternating voltage to produce a secondary winding side DC output voltage;

switching frequency variation means for varying an inductance of said self excited oscillation drive circuit in response to a control current level supplied thereto to vary a switching frequency of said switching element;

constant voltage control means for varying the control current in response to the level of the secondary winding side DC output voltage and supplying the varied control current to said switching frequency variation means to variably control the switching frequency thereby to effect constant voltage control for the secondary side DC output voltage; and switching frequency control means for receiving a start-up power supply obtained upon, or immediately after start up of said switching power supply circuit as an input thereto and for supplying a control current of a predetermined level over a predetermined period of time after start-up in place of said constant voltage control means to control the switching frequency so that the switching frequency remains within a predetermined range.

2. The switching power supply circuit according to claim 1, further comprising:

a tertiary winding wound at a position on said primary winding of said insulating converter transformer spaced by more than a predetermined physical distance from said secondary winding; and a rectifier smoothing circuit connected to said tertialy winding, the start-up power supply which is supplied to said switching frequency control means being a DC voltage obtained by said rectifier smoothing circuit.

3. The switching power supply circuit as claimed in claim 1, further comprising:

standby power supply means for receiving the commercial ac power supply as an input thereto and producing a DC voltage as a standby power supply voltage from the input commercial ac power supply; and switching start-up means for making use of the standby power supply voltage to produce a switching start-up signal which can be used to start said switching means, the switching start-up signal being used as the start-up power supply to be supplied to said switching frequency control means.

4. The switching power supply circuit according to claim 1, further comprising operation period setting means for variably setting an operation period of said switching frequency control means.

5. A switching power supply circuit, comprising:

a rectifier smoother for receiving a commercial ac power supply as an input and producing and outputting a rectified smoothed DC voltage;

a switch for providing a switched output, said switch comprising:
  a switching element for receiving and switchably outputting the DC voltage; and
  a self-excited oscillation drive circuit for switchably driving said switching element in a self-excited manner;

an insulating converter transformer for transmitting the output of said switching means to a secondary winding side of said switching power supply circuit;

a primary winding side resonance circuit formed at least from a leakage inductance component including a primary winding of said insulating converter transformer and a capacitance of a resonance capacitor, said primary winding side resonance circuit operating said switch in a resonance type operation; and a secondary winding side resonance circuit formed on the secondary winding side of said switching power supply circuit, including a leakage inductance component of a secondary winding of said insulating converter transformer and a capacitance of a secondary side resonance capacitor;

DC output voltage producer, including said secondary side resonance circuit, for receiving an alternating voltage obtained at said secondary winding of said insulating converter transformer as an input thereto and performing a full-wave rectification operation for the input alternating voltage to produce a secondary winding side DC output voltage;

a switching frequency varier for varying an inductance of said self-excited oscillation drive circuit in response to a control current level supplied thereto to vary a switching frequency of said switching element;

a constant voltage controller for varying the control current in response to the level of the secondary winding side DC output voltage and supplying the varied control current to said switching frequency varier means to variably control the switching frequency thereby to effect constant voltage control for the secondary side DC output voltage; and a switching frequency controller for receiving a start-up power supply obtained upon, or immediately after start up of said switching power supply circuit as an input thereto and for supplying a control current of a predetermined level over a predetermined period of time after start-up in place of said constant voltage controller to control the switching frequency so that the switching frequency remains within a predetermined range.

6. The switching power supply circuit according to claim 5, further comprising:

a tertiary winding wound at a position on said primary winding of said insulating converter transformer spaced by more than a predetermined physical distance from said secondary winding; and a rectifier smoothing circuit connected to said tertiary winding, the start-up power supply which is supplied to said switching frequency control means being a DC voltage obtained by said rectifier smoothing circuit.

7. The switching power supply circuit as claimed in claim 5, farther comprising:

a standby power supplier for receiving the commercial ac power supply as an input thereto and producing a DC voltage as a standby power supply voltage from the input commercial ac power supply; and a start-up switcher for making use of the standby power supply voltage to produce a switching start-up signal which can be used to start said switcher, the switching start-up signal being used as the start-up power supply to be supplied to said switching frequency controller.

8. The switching power supply circuit according to claim 5, further comprising an operation period setter means for variably setting an operation period of said switching frequency controller.

9. A switching power supply method, comprising the steps of:

receiving a commercial ac power supply by a rectifier smoother as an input;

producing and outputting a rectified smoothed DC voltage;

providing a switched output by a switcher, said switcher comprising:

a switching element for receiving and switchably outputting the DC voltage;

a self-excited oscillation drive circuit for switchably driving said switching element in a self-excited manner;

an insulating converter transformer for transmitting the output of said switching means to a secondary winding side of said switching power supply circuit;

a primary winding side resonance circuit formed at least from a leakage inductance component including a primary winding of said insulating converter transformer and a capacitance of a resonance capacitor, said primary winding side resonance circuit operating said switching means in a resonance type operation; and a secondary winding side resonance circuit formed on the secondary winding side of said switching power supply circuit, including a leakage inductance component of a secondary winding of said insulating converter transformer and a capacitance of a secondary side resonance capacitor;

receiving an alternating voltage as an input to a DC output voltage producer, including said secondary side resonance circuit, obtained at said secondary winding of said insulating converter transformer;

performing a full-wave rectification operation for the input alternating voltage to produce a secondary winding side DC output voltage;

varying an inductance of said self-excited oscillation drive circuit by a switching frequency varier in response to a control current level supplied thereto to vary a switching frequency of said switching element;

varying the control current in response to the level of the secondary winding side DC output voltage;

supplying the varied control current to said switching frequency varier to variably control the switching frequency thereby to effect constant voltage control for the secondary side DC output voltage; and receiving a start-up power supply by a switching frequency controller obtained upon or immediately after start up of said switching power supply circuit as an input thereto and for supplying a control current of a predetermined level over a predetermined period of time after start-up in place of said supplied control current to control the switching frequency so that it remains within a predetermined range.

10. The method according to claim 9, further comprising the steps of:

providing a tertiary winding at a position on said primary winding of said insulating converter transformer spaced by more than a predetermined physical distance from said secondary winding; and connecting a rectifier smoothing circuit to said tertiary winding, whereby the start-up power supply supplied to said switching frequency control means is a DC voltage obtained by said rectifier smoothing circuit.

11. The method of claim 9, further comprising the steps of receiving the commercial ac power supply by a standby power supplier as an input thereto;

producing a DC voltage as a standby power supply voltage from the input commercial ac power supply; and producing a switching start-up signal according to the standby power supply voltage which can be used to start said switcher, the switching start-up signal being used as the start-up power supply to be supplied to said switching frequency controller.

12. The method of claim 9, further comprising the step of variably setting an operation period of said switching frequency controller.

13. A switching power supply circuit including a resonance type converter, comprising:

switching frequency control means for receiving a start-up power supply obtained upon, or immediately after start-up of said switching power supply circuit as an input obtained thereto; and means for supplying a control current of a predetermined level over a predetermined period of time after start-up in place of a voltage control signal to control a switching frequency of a switching element so that the switching frequency remains within a predetermined range, whereby said switching frequency is raised immediately after start-up and gradually decreased thereafter.

14. A switching power supply circuit including a resonance type converter, comprising:

a switching frequency controller for receiving a start-up power supply obtained upon, or immediately after start-up of said switching power supply circuit as an input obtained thereto; and a supplier for supplying a control current of a predetermined level over a predetermined period of time after start-up in place of a voltage control signal to control a switching frequency of a switching element so that the switching frequency remains within a predetermined range, whereby said switching frequency is raised immediately after start-up and gradually decreased thereafter.

15. A switching power supply method employing a resonance type converter, comprising the steps of:

receiving as an input a start-up power supply obtained on, or immediately after start-up; and supplying a control current of a predetermined level over a predetermined period of time after start-up in place of a voltage control signal to control a switching frequency of a switching element so that the switching frequency remains within a predetermined range, whereby said switching frequency is raised immediately after start-up and gradually decreased thereafter.

* * * * *